(12) United States Patent
Ni et al.

(10) Patent No.: US 7,758,083 B2
(45) Date of Patent: Jul. 20, 2010

(54) WALL BUSHING FOR AIR CONDITIONER

(75) Inventors: Boyang Ni, No. 1, Xingxian Road, Yangming Technological Industrial Park, Yuyao, Zhejiang (CN) 315332; Zhigang Wang, Zhejiang (CN); Deyong Fang, Zhejiang (CN)

(73) Assignee: Boyang Ni, Yuyao, Zhejiang (CN)

( * ) Notice: Subject to any disclaimer, the term of this patent is extended or adjusted under 35 U.S.C. 154(b) by 0 days.

(21) Appl. No.: 11/911,790

(22) PCT Filed: Apr. 13, 2006

(86) PCT No.: PCT/CN2006/000669

§ 371 (c)(1),
(2), (4) Date: Oct. 17, 2007

(87) PCT Pub. No.: WO2006/111071

PCT Pub. Date: Oct. 26, 2006

(65) Prior Publication Data

US 2008/0211227 A1    Sep. 4, 2008

(30) Foreign Application Priority Data

Apr. 18, 2005 (CN) .................. 2005 2 0101684 U

(51) Int. Cl.
*F16L 3/00* (2006.01)

(52) U.S. Cl. .................. 285/123.14; 285/123.13; 285/123.15; 285/148.27; 285/901; 138/89.1

(58) Field of Classification Search ............ 285/123.13, 285/123.14, 123.15, 123.3, 424, 901, 148.27, 285/188; 138/89.1; 181/207–209; 62/259.1
See application file for complete search history.

(56) References Cited

U.S. PATENT DOCUMENTS

| 2,014,666 | A | * | 9/1935 | Peik ........................... 181/252 |
| 2,959,196 | A | * | 11/1960 | Truesdell et al. ............. 138/148 |
| 3,065,002 | A | * | 11/1962 | Waalkes et al. ............. 285/315 |
| 3,482,626 | A | * | 12/1969 | Gainsboro et al. .......... 165/155 |

* cited by examiner

*Primary Examiner*—Aaron M Dunwoody
*Assistant Examiner*—Fannie Kee
(74) *Attorney, Agent, or Firm*—Global IP Services; Tianhua Gu

(57) ABSTRACT

A wall bushing for an air-conditioner comprises an external pipe and an internal pipe. The cross section of the external pipe is a "sports ground" shape, and an inner circular wall of the external pipe is tangential to an outer circular wall of the internal pipe. An end of the internal pipe is connected to an air outlet port of the air conditioner, and an end of the external pipe is connected to an air inlet port.

7 Claims, 4 Drawing Sheets

WALL BUSHING FOR AIR CONDITIONER

TECHNICAL FIELD

This invention relates generally to sleeves for air-conditioners, more particularly, this invention relates to a wall bushing for an air-conditioner.

BACKGROUND ART

The people's requirements for the quality of their living environment become higher and higher with the improvement of living standards, so that the mobile air-conditioners come into widespread use. Mobile air-conditioners have no outdoor machine, but that have an inlet pipe and an outlet pipe. Both the inlet pipe and the outlet pipe are put into the intake on the wall body while operation. This is environment-friendly and energy-conserving. However, while using the mobile air-conditioner, the outlet pipe might fall out of the intake on the wall body and cause leakage of air.

DISCLOSURE OF THE INVENTION

The present invention intends to provide a wall bushing for an air-conditioner which can prevent the outlet pipe of air-conditioner from falling out of the intake on the wall body and causing air leakage.

To overcome the problems of prior art, the present invention proposes the following technical solution:

A wall bushing for air-conditioner comprises an outer pipe is coupled to the inlet port of the air-conditioner, and an inner pipe disposed inside the outer pipe and which is coupled to the outlet port of the air-conditioner. The section of said outer pipe perpendicular to a longitudinal axis of the pipe takes the form of a ground track field, similar to an oval shape or two half-circles connected by parallel lines tangential to the half-circles. The inner wall arc of said outer pipe forms a tangent with the outer wall arc of said inner pipe.

For a preferred embodiment, two ends of said outer pipe in longitudinal direction are equipped with an inner joint and an outer joint, said inner joint and said outer joint are fixed by at least one rod, preferably an iron rod which passes through said outer pipe.

For a preferred embodiment, the inner wall of said outer pipe is equipped with at least one fixed slot or channel, e.g. at the parallel wall section connecting the half circles, which is configured to receive said iron rod.

For a preferred embodiment, both said inner joint and said outer joint take the form of the ground track field, the size of which is larger than that of said outer pipe's cross section, wherein said outer joint is equipped with a hole which matches said inner pipe i.e. has the same shape and size as the cross section of the inner pipe in a direction perpendicular to a longitudinal axis of said inner pipe.

For a preferred embodiment, said outer joint as a filter below and a dust-proof cover door above, preferably in the orientation in use. The cover door covers the cross section corresponding to the inner pipe, whereas the dust filter covers the remaining cross sectional area of outer pipe.

For a preferred embodiment, two sides of said outer joint are equipped with slots, extending parallel to the longitudinal direction of said pipes. One outer end face of said iron rod is equipped with a T head or protrusion which matches said slot; said iron rod passes through said slot and rotates 90° to be fixed with said outer joint.

For a preferred embodiment, one inner end face of said iron rod is equipped with a staple bolt; said iron rod is fixed with said inner joint by said staple bolt.

For a preferred embodiment, the section of said inner pipe is round.

For a preferred embodiment, the section of said inner pipe is elliptic.

A wall bushing for air-conditioner designed according to the present technical solution includes the outer pipe and inner pipe within. The two sides of the outer pipe are equipped with an inner and outer joint; the inner pipe is coupled with the air outlet. The inner and outer pipes can be fixed safely on the intake of the wall body. Neither will the outlet pipe fall out of the intake on the wall body nor cause air leakage. The outer joint is equipped with a filter which prevents too large powder, dust and foreign bodies entering the air inlet pipe. Installation requires no outdoor operation. The structure is simple and installation is convenient and facilitating energy exchange of inlet and outlet air.

DETAILED DESCRIPTION OF THE INVENTION

Figure 1:
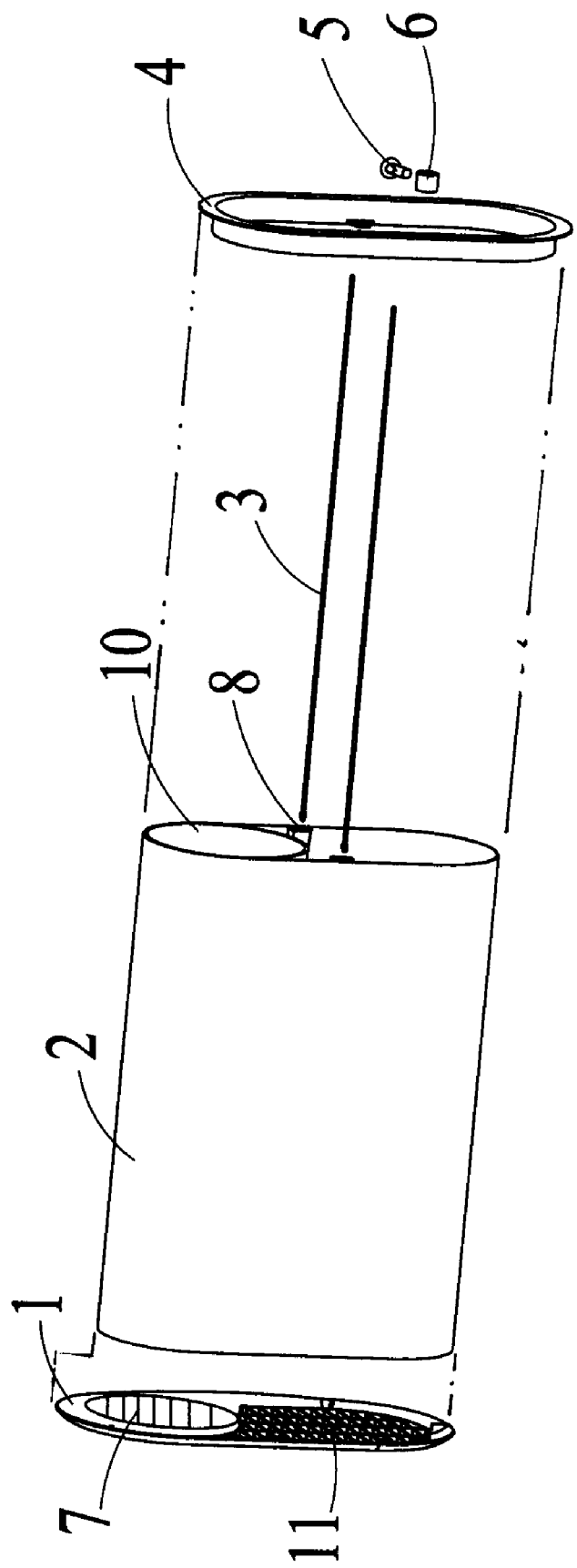
FIG. 1 is a perspective view of the elements forming a sleeve of a preferred embodiment of the present invention.
Figure 2:
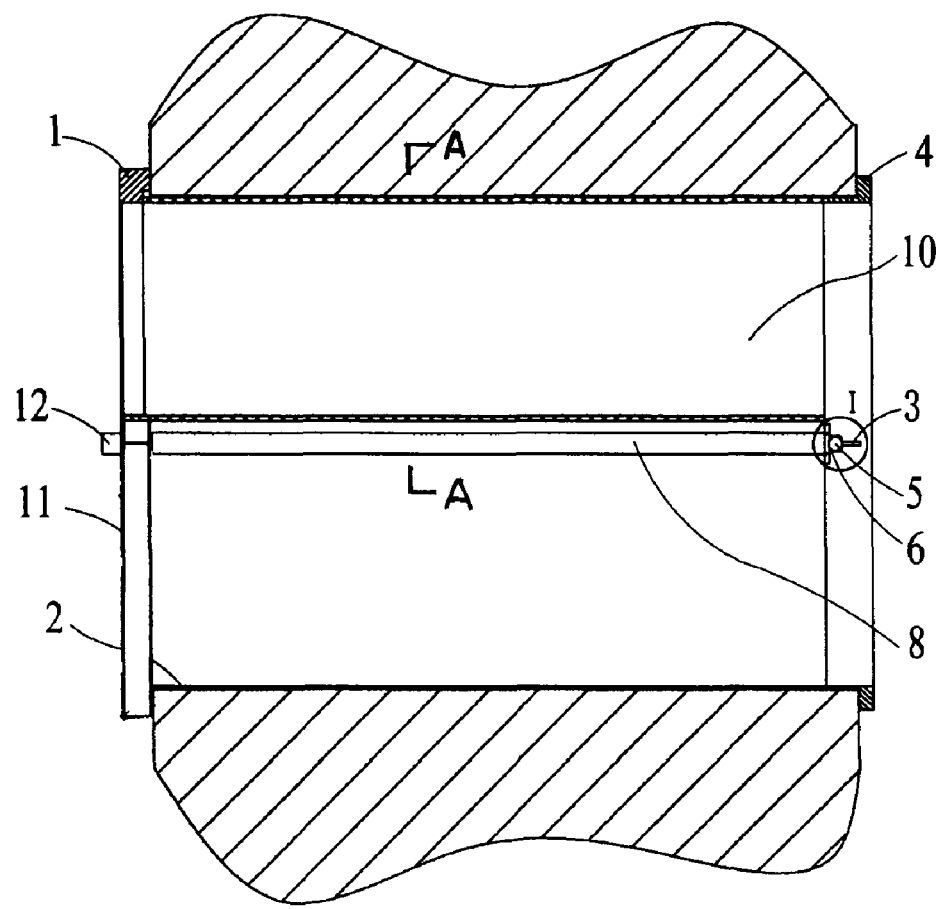
FIG. 2 is a full section view of the preferred embodiment of the present invention.
Figure 2A:
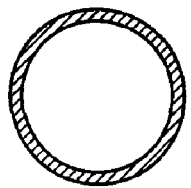
FIGS. 2a and 2b are different cross sectional views at line A-A in FIG. 2.
Figure 2B:
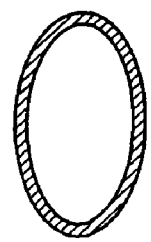
Figure 3:
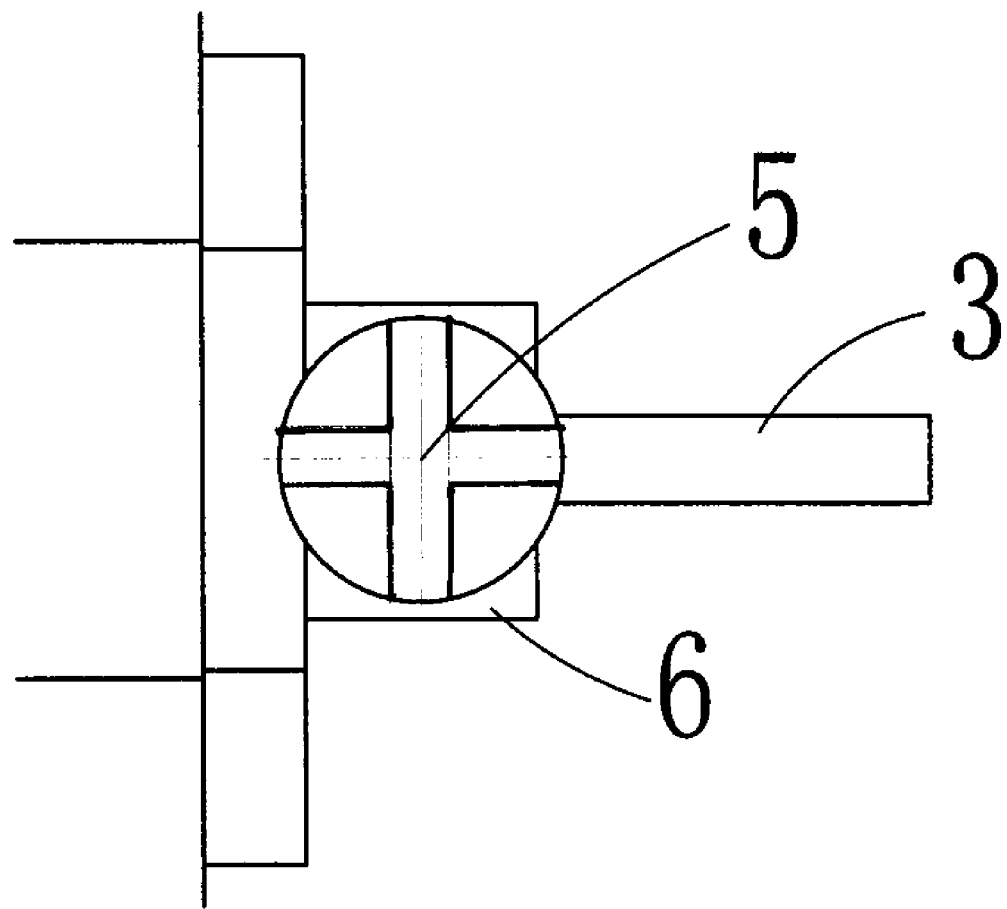
FIG. 3 is an enlargement view of "I" on FIG. 2.
Figure 4:
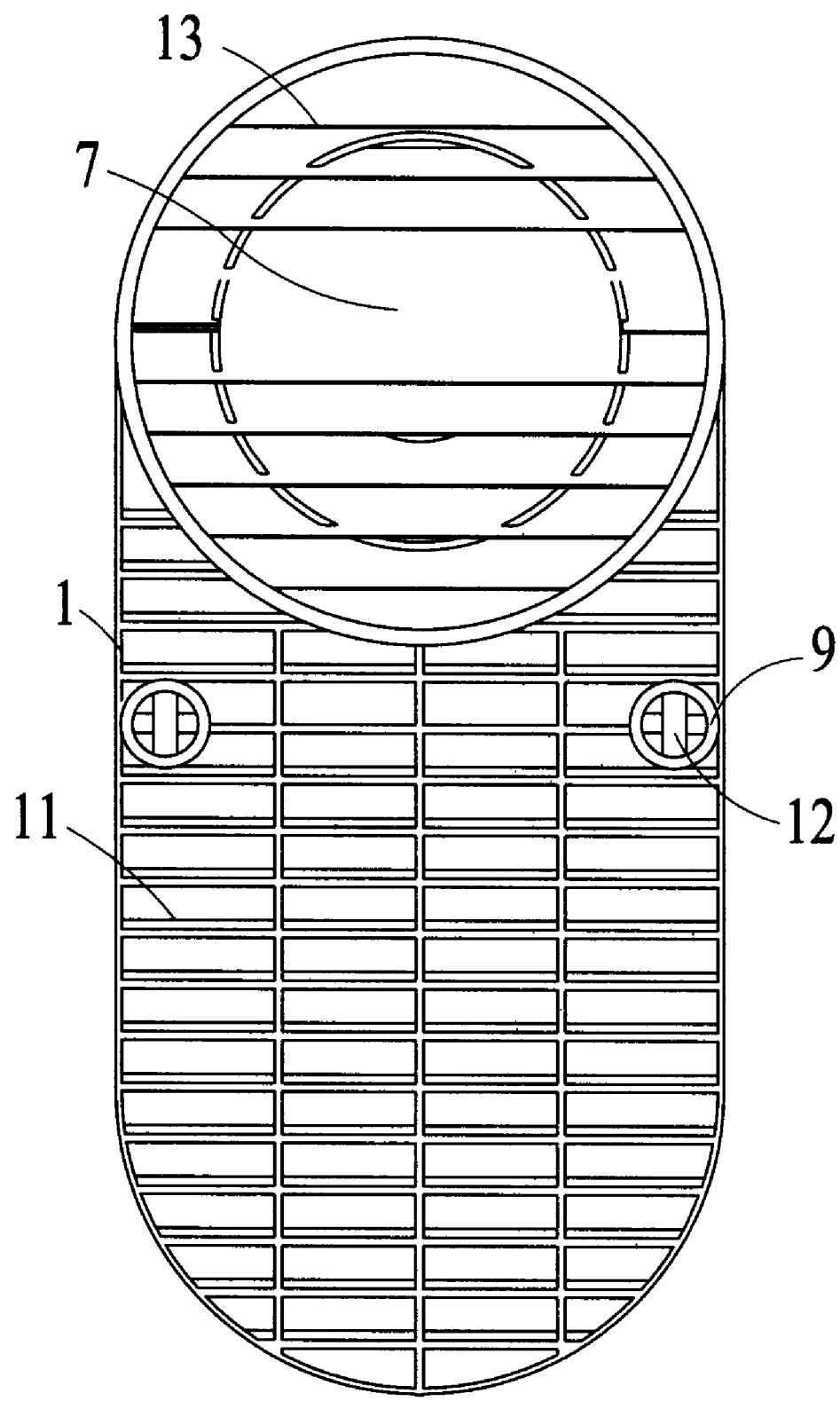
FIG. 4 is a side view of the preferred embodiment of the invention.

With reference to FIGS. 1 to 3 and the preferred embodiment of the invention, detailed description of the invention is as follows:

A wall bushing for air-conditioner is put into an intake of a wall body. The sleeve includes an outer pipe 2 and an inner pipe 10. The section of the outer pipe 2 takes the form of a ground track field. The section of the inner pipe 10 is round. The outer wall arc of the inner pipe 10 is tangent to the inner wall arc of the outer pipe 2. One end of the inner pipe 10 couples with an outlet port of the air-conditioner by an outlet pipe which matches the outlet port; one end of the outer pipe 2 couples with the inlet port of the air-conditioner by an inlet pipe which matches the inlet port.

The two ends of the outer pipe 2 are equipped with an outer joint 1 and an inner joint 4, respectively. Both sections of the inner joint 4 and of the outer joint 1 take the form of the ground track field. The size of the sections on the outer joint 1 and the inner joint 4 is larger than the outer pipe's section, so that the inner joint 4 and outer joint 1 can respectively easily cover in the two ends of the outer pipe 2.

The outer joint 1 is equipped also with a hole 7 configured to match the inner pipe 10. A filter 11 is placed at the underside of the outer joint 1 to prevent large power, dust or foreign bodies from entering the inner pipe 10, and further, entering the inlet pipe of the air-conditioner, and a dust-proof cover door 13 is placed at the upside of the outer joint 1 to prevent foreign bodies from entering the outer pipe 2, and further, entering the outer pipe of the air-conditioner.

There are two fixed slots 8 installed on the inner wall of the outer pipe 2; the corresponding fixed slots 8 are configured to receive and position two iron rods 3. One end face of the iron rod 3 has a T head 12 or a shaped end, such that it can pass through the slot when being in one orientation and cannot pass though the slot in a second orientation, e.g. rotated by 90° with respect to the first orientation. The two sides of outer joint 1 are equipped with two slots 9. The slot 9 matches the T head 12. Once the iron rod 3 passes through the fixed slot 8 and the slot 9, and then rotates 90 degrees, as a result, the outer joint 1 is fixed.

The inner side of the other end of iron rod 3 is equipped with a staple bolt, which includes a ring 6 and a bolt 5. The other end of the iron rod 3 passes through the inner joint 4. A staple bolt is put in the iron rod 3, and the iron rod 3 is locked with inner joint 4 by the staple bolt.

The installation is very easy as shown in FIGS. 1 to 3:

Firstly, the sleeve is enclosed in a wall from an inner wall side. The outer joint 1 is installed from the sleeve at the outer wall to couple it with the sleeve, and the iron rod 3 is led through the fixed slot 8 in the sleeve to the T head 12 to connect the outer joint 1. The iron rod 3 rotated by 90° and the inner joint 4 is led through the iron rod 3 to work in with the inner wall. The bolt 5 is screwed in the ring 6 to lock the iron rod 3, thereby the lock is completed by means of the staple bolt. The sleeve can be cut in lengthwise direction in accordance with the thickness of the wall body.

The section of the inner pipe 10 is also like an ellipse, for other preferred embodiments.

What is claimed is:

1. A wall bushing, for an air-conditioner, the bushing comprising:
    an outer pipe, for coupling with an inlet port of the air-conditioner, having a first end, a second end, and a cross section defined by two arc ends and two parallel sides;
    an inner pipe, for coupling with an outlet port of the air-conditioner, having a first end, a second end and being located in said outer pipe and tangent with one of the arc ends and jointed thereof with the outer pipe;
    an outer joint located at the first end of said outer pipe and an inner joint located at the second end of said outer pipe, the inner and outer joints each having a cross section which is greater in diameter than the cross section of the outer pipe; and
    at least one rod connecting the inner and outer joints to the outer pipe wherein the rod is passed through the outer pipe to connect the outer joint, the inner joint, the outer pipe and the inner pipe together.

2. The wall bushing for an air-conditioner according to claim 1, wherein an inner wall of said outer pipe is equipped with at least one fixed slot for placing said rod.

3. The wall bushing for an air-conditioner according to claim 2, wherein said outer joint is equipped with two fixed slots, said outer pipe having two rods connecting the outer pipe with the inner and outer joints, each rod having a first end and a second end with a T-shaped head at said first end of each rod, said T-shaped head of each rod being passed through each of said two fixed slots when said T-shaped head is parallel to the slot and wherein said T-shaped head is then rotated 90° to fix said outer joint to said outer pipe.

4. The wall bushing for an air-conditioner according to claim 3, wherein said second end of each of said rods is equipped with a staple bolt including a ring and a bolt and said rods are fixed to said inner joint by said staple bolt.

5. The wall bushing for an air-conditioner according to claim 1, wherein said outer joint has a filter for the outer pipe and a dust-proof cover door for the inner pipe.

6. The wall bushing for an air-conditioner according to claim 1, wherein a cross section of said inner pipe is round.

7. The wall bushing for an air-conditioner according to claim 1, wherein a cross section of said inner pipe is elliptical.

* * * * *